United States Patent
Retureau et al.

(10) Patent No.: US 11,070,885 B2
(45) Date of Patent: Jul. 20, 2021

(54) METHOD AND APPARATUS FOR CONTROLLING PLAYBACK OF MEDIA USING A SINGLE CONTROL

(71) Applicant: INTERDIGITAL MADISON PATENT HOLDINGS SAS, Paris (FR)

(72) Inventors: Arnaud Retureau, West Hollywood, CA (US); Juan M. Noguerol, Gardena, CA (US); Ananias Johnson, Encino, CA (US)

(73) Assignee: INTERDIGITAL MADISON PATENT HOLDINGS SAS, Paris (FR)

( * ) Notice: Subject to any disclaimer, the term of this patent is extended or adjusted under 35 U.S.C. 154(b) by 0 days.

(21) Appl. No.: 15/741,228

(22) PCT Filed: Jun. 22, 2016

(86) PCT No.: PCT/US2016/038669
§ 371 (c)(1),
(2) Date: Dec. 29, 2017

(87) PCT Pub. No.: WO2017/003779
PCT Pub. Date: Jan. 5, 2017

(65) Prior Publication Data
US 2018/0199108 A1     Jul. 12, 2018

Related U.S. Application Data

(60) Provisional application No. 62/186,885, filed on Jun. 30, 2015.

(51) Int. Cl.
*H04N 21/472*     (2011.01)
*H04N 21/6587*    (2011.01)
(Continued)

(52) U.S. Cl.
CPC ....... *H04N 21/47217* (2013.01); *H04N 5/445* (2013.01); *H04N 21/6587* (2013.01); *H04N 5/76* (2013.01)

(58) Field of Classification Search
CPC ............... H04N 21/42717; H04N 21/6587
See application file for complete search history.

(56) References Cited

U.S. PATENT DOCUMENTS 8,068,716 B2   11/2011  Khan et al.
8,929,718 B2 *  1/2015  Griffin ........... H04N 21/812
                                               386/262
(Continued)

FOREIGN PATENT DOCUMENTS

CN   102196249 A   9/2011
CN   102290082 A   12/2011
(Continued)

OTHER PUBLICATIONS

English Language Abstract of Chinese Publication No. CN 102290082 A.
(Continued)

*Primary Examiner* — Olugbenga O Idowu
(74) *Attorney, Agent, or Firm* — Patricia A. Verlangieri

(57) ABSTRACT

Playback of content is modified by the application of an operation that is determined in response to a received control signal. The operation performed for the content is determined by the time position in the playback of the content where the presence of the time position in different time segments of the content will have different corresponding operations performed.

16 Claims, 5 Drawing Sheets

(51) Int. Cl.
*H04N 5/445* (2011.01)
*H04N 5/76* (2006.01)

(56) References Cited

U.S. PATENT DOCUMENTS

| | | |
|---|---|---|
| 2002/0012526 A1 | 1/2002 | Sai et al. |
| 2007/0256023 A1* | 11/2007 | Noessel ................. G06Q 30/02 715/753 |
| 2008/0039072 A1 | 2/2008 | Bloebaum |
| 2009/0269025 A1* | 10/2009 | Bedingfield, Sr. .......................... H04N 21/47217 386/248 |
| 2010/0189412 A1 | 7/2010 | Chang et al. |
| 2011/0109730 A1* | 5/2011 | Aubey, Jr. ............ H04N 13/361 348/51 |
| 2011/0243525 A1 | 10/2011 | Chaudhri et al. |
| 2015/0026575 A1 | 1/2015 | Martin |
| 2015/0032855 A1* | 1/2015 | Wang ..................... H04L 65/60 709/219 |

FOREIGN PATENT DOCUMENTS

| | | |
|---|---|---|
| WO | WO2013169851 | 11/2013 |
| WO | WO2014086390 | 6/2014 |

OTHER PUBLICATIONS

English Language Abstract of Chinese Publication No. CN 102196249 A.

* cited by examiner

METHOD AND APPARATUS FOR CONTROLLING PLAYBACK OF MEDIA USING A SINGLE CONTROL

This application claims the benefit, under 35 U.S.C. § 365 of International Application PCT/US2016/038669, filed Jun. 22, 2016, which was published in accordance with PCT Article 21(2) on Jan. 5, 2017, in English, and which claims the benefit of U.S. Provisional Application No. 62/186,885, filed Jun. 30, 2015.

BACKGROUND

Many users utilize different mechanisms such as a remote control or a user interface to control the playback of content such as audio, video, streaming media, and the like. The remote control or user interface can have many different buttons such as play, pause, fast forward, reverse, and the like, which are used to control the playback of such content. The playback of media even becomes more complex when additional options are presented to the user such as bookmarking the media, finding out more information about the content being outputted, and determining what additional media is related to media currently being played back.

Thus there is a need to simply the playback of content without the need to resort to the use of many different controls and buttons presented on a remote control or user interface.

SUMMARY

The preceding Summary is intended to serve as a brief introduction to various features of some exemplary embodiments. Other embodiments may be implemented in other specific forms without departing from the scope of the disclosure. Playback of content is modified by the application of an operation that is determined in response to a received control signal. The operation performed for the content is determined by the time position in the playback of the content where the presence of the time position in different time segments of the content will have different corresponding operations performed.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various inventive features are described below that can each be used independently of one another or in combination with other features.

Broadly, some exemplary embodiments generally provide many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions. In some exemplary embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 1:
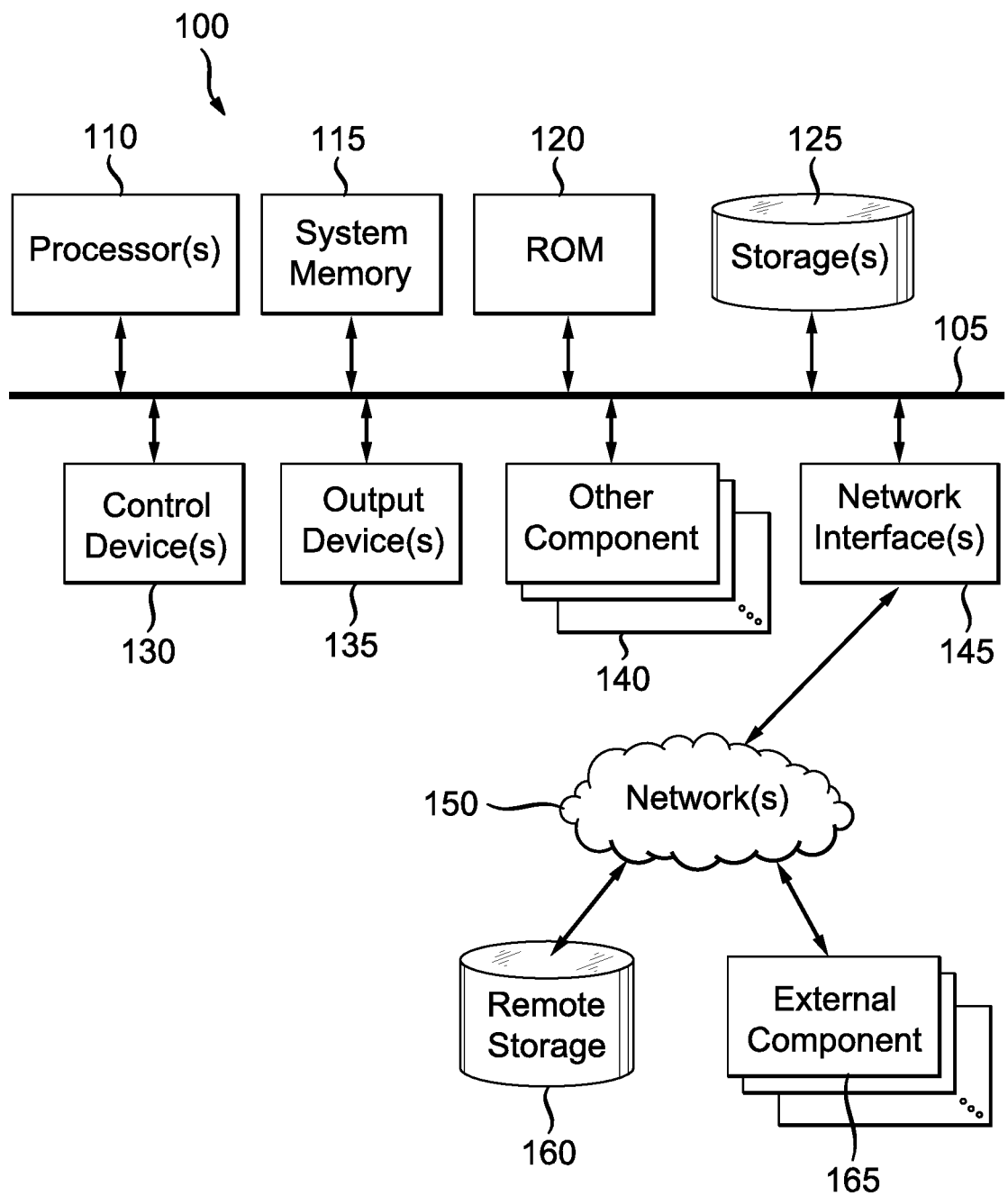
FIG. 1 illustrates a schematic block diagram of an exemplary computer system used to implement some embodiments.

FIG. 1 illustrates a schematic block diagram of an exemplary computer system 100 used to implement some exemplary embodiments. For example, the system described in reference to FIG. 2 below may be at least partially implemented using computer system 100. As another example, the exemplary processes described below may be at least partially implemented using sets of instructions that are executed using computer system 100 as well.

Computer system 100 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 100 may include at least one communication bus 105, one or more processors 110, a system memory 115, a read-only memory (ROM) 120, permanent storage devices 125, control devices 130, output devices 135, various other components 140 (e.g., a graphics processing unit), and one or more network interfaces 145.

Bus 145 represents all communication pathways among the elements of computer system 100. Such pathways may include wired, wireless, optical, and/or other appropriate communication pathways. For example, control devices 130 and/or output devices 135 may be coupled to the system 100 using a wireless connection protocol or system.

The processor 110 may, in order to execute the processes of some embodiments, retrieve instructions to execute and/or data to process from components such as system memory 115, ROM 120, and permanent storage device 125. Such instructions and data may be passed over bus 105.

System memory 115 may be a volatile read-and-write memory, such as a random access memory (RAM). The system memory may store some of the instructions and data that the processor uses at runtime. The sets of instructions and/or data used to implement some embodiments may be stored in the system memory 115, the permanent storage device 125, and/or the read-only memory 120. ROM 120 may store static data and instructions that may be used by processor 110 and/or other elements of the computer system.

Permanent storage device 125 may be a read-and-write memory device. The permanent storage device may be a non-volatile memory unit that stores instructions and data even when computer system 100 is off or unpowered. Computer system 100 may use a removable storage device and/or a remote storage device as the permanent storage device.

Control devices 130 may enable a user to communicate information to the computer system and/or manipulate various operations of the system. The control devices may include keyboards, cursor control devices, audio input devices and/or video input devices. Output devices 135 may include printers, displays, and/or audio devices. Some or all of the input and/or output devices may be wirelessly or optically connected to the computer system.

Other components 140 may perform various other functions. These functions may include performing specific functions (e.g., graphics processing, sound processing, etc.), providing storage, interfacing with external systems or components, etc.

Finally, as shown in FIG. 1, computer system 100 may be coupled to one or more networks 150 through one or more network interfaces 145. For example, computer system 100 may be coupled to a web server on the Internet such that a web browser executing on computer system 100 may interact with the web server as a user interacts with an interface that operates in the web browser. Computer system 100 may be able to access one or more remote storages 160 and one or more external components 165 through the network interface 145 and network 150. The network interface(s) 145 may include one or more application programming interfaces (APIs) that may allow the computer system 100 to access remote systems and/or storages and also may allow remote systems and/or storages to access computer system 100 (or elements thereof). As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 100 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Figure 2:
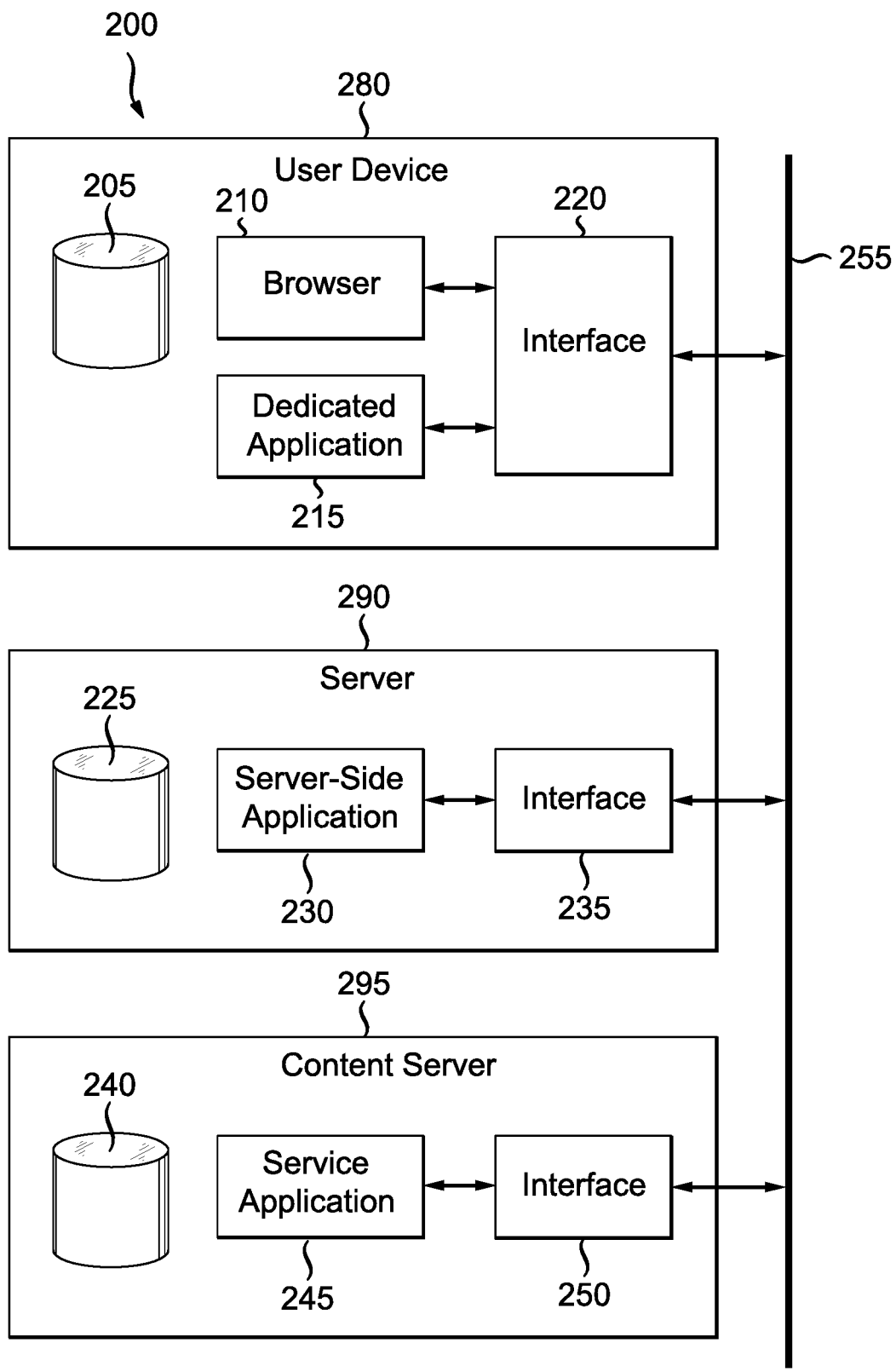
FIG. 2 illustrates a schematic block diagram of a system used by some embodiments to provide the media playback environment.

FIG. 2 illustrates a schematic block diagram of a system 200 used by some embodiments to provide content for the application of the disclosed principles. As shown, the system may include a server 290 with associated storages 225, a content server 295 with associated storages 240, and user device 280.

The server 290 may be a computing device that is able to execute instructions and/or process data. The server may be able to access other system elements via various communication pathways (e.g., wired connections, local area wireless connections, etc.) and using various appropriate networks (e.g., local area networks, cellular networks, the Internet, etc.). Storage 225 may be a device capable of receiving, storing, and/or providing instructions and/or data. Storage 225 can be a memory that includes a disk drive, a hard drive, RAM, ROM, optical storage, solid state memory, DRAM, and the like.

Content server 295 and storage 240 may be similar to server 290 and storage 225. The content server 295 may be associated with various third-party content sources (e.g., social media platforms, multimedia web sites, etc.) while server 290 may be associated providing content in some embodiments. In some cases, servers 290 and 295 may be implemented using one computing device (and/or an associated set of computing devices). In some embodiments, content server 295 may interact with server 290 (and/or storage 225) via one or more application programming interfaces (APIs). Storage 240 can be a memory that includes a disk drive, a hard drive, RAM, ROM, optical storage, solid state memory, DRAM, and the like.

User device 280 may include various device types (e.g., personal computers, tablets, smartphones, etc.). Such devices may be able to access the servers 290 and/or 295 using various communication pathways and/or networks. In some exemplary embodiments, user device 280 can have content available for playback via storage 205. As shown, the user device 280 includes a storage element 205, a browser 210, a dedicated application 215, and an interface 220.

One of ordinary skill in the art will recognize that the systems of FIG. 2 are exemplary and different embodiments may be implemented in various different ways without departing from the scope of the disclosure. For instance, some embodiments may include additional elements or omit some elements. As another example, different embodiments may combine or divide various elements. In addition, multiple instances of any elements may be included.

Figure 3:
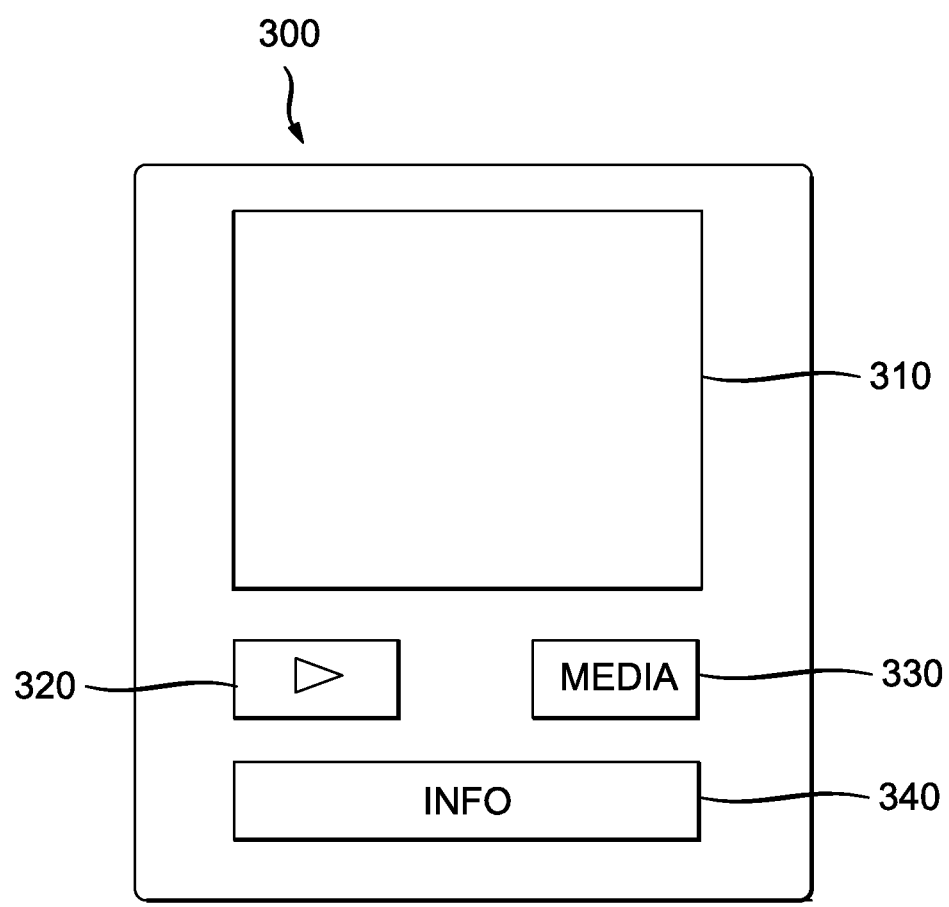
FIG. 3 illustrates an exemplary user interface used to playback content in accordance with some embodiments.

FIG. 3 illustrates an exemplary user interface 300 used to playback content in accordance with some embodiments. That is, the user interface can be used with a user device 280 to control the playback of content whether from local storage 205 or content that is received from server 290, content server 295, and the like.

User interface 300 has a display window 310 where content can be outputted in the form of video, an animation, pictures, and the like. Control 320 is shown as a button when activated produces a signal that can be used to initiate the playback of content and to control subsequent operations as described below. Exemplary embodiments of the disclosed principles can utilize control 320 to control most playback and related operations including fast forward, reverse, pause, begin present content again, jump to the next piece of content, and the like. That is, control 320 can be implemented in exemplary embodiments to be the primary means of controlling the playback of content where the various operations will depend on a time position in the playback of the media, as explained below.

User interface 300 also has a media button 330 which provides a user with the ability to select between different content. In some exemplary embodiments, the activation of media button 330 can provide a user a playlist where the user can designate an order in which different content is to be played back. Likewise, a user can also specify in some exemplary embodiments that random content can be played back based on settings decided upon by the user. Other exemplary embodiments of what content is to be selected can be implemented in accordance with the disclosed principles. The activation of button 340 provides information about content that is currently being played back in window 310. The information provided for such activation can include the title of content, the actors starring in such content, the director of content, the genre of content, the musicians who created content, the year the content was created, the current time position in the playback of media, and the like.

Figure 4:
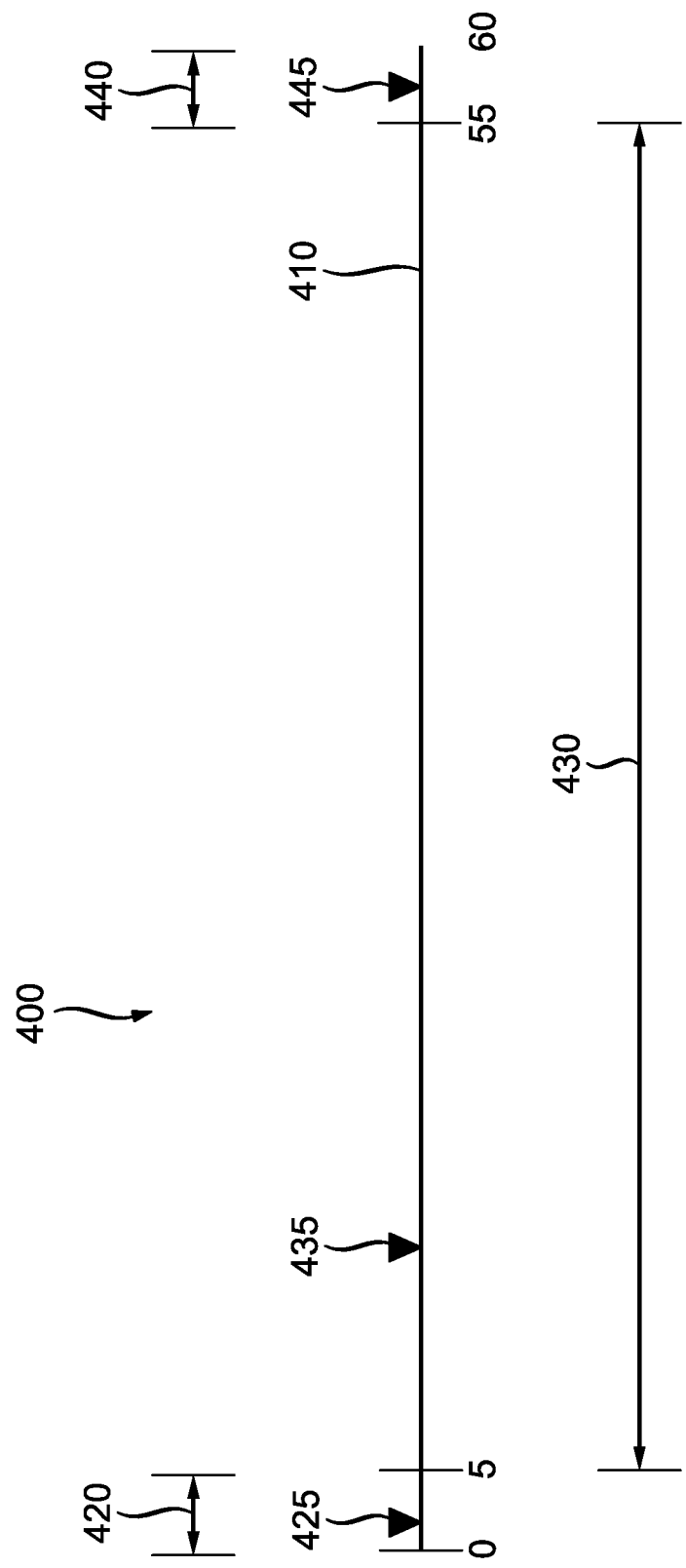
FIG. 4 illustrates an exemplary diagram corresponding to the playback time for content in accordance with some embodiments.

FIG. 4 illustrates an exemplary diagram 400 corresponding to the playback time for content. Specifically, a timeline 410 shown in diagram 400 represents the complete time duration of a piece of content where in this exemplary embodiment, the content is 60 minutes long, although content can be any time length in accordance with the disclosed principles. Within exemplary timeline 410, there are three time segments that are shown: the first time segment 420 represents the beginning part of content which is 5 minutes in duration (0 to 5 minutes shown on timeline 410), the second time segment 430 represents the middle part of content which is 50 minutes in duration (5 minutes to 55 minutes shown on timeline 410), and the third time segment 440 represents the ending of content which is 5 minutes in duration (55 to 60 minutes shown on timeline 410). Likewise, time position 425 represents a possible playback position within time segment 420, time position 435 represents a possible playback position within time segment 430, and time position 445 represents a possible playback position within time segment 440. Other time positions are possible in accordance with the exemplary principles of the invention.

As the playback of content progresses, the time position of in the playback of media will advance accordingly. Within exemplary implementations of the disclosed principles, different operations can occur when a control 320 is activated by a user as to generate a signal. In some exemplary embodiments of the disclosed principles, the playback of media will jump to the beginning of the content if the time position in the playback of the media is in the first time segment 425. In addition, the playback of media will be paused in response to the activation of control 320 if the time position in the playback of the content is in the second time segment 435. Lastly, the playback of content will halt and jump to the beginning of a second piece of media for playback in response to the activation of control 320 if the time in the playback of the content is in time segment 445.

Other examples of what operations can be implemented during what time segments of the playback of content can be defined by a content provider, by a consumer electronic device manufacturer, a media service provider, a user, and the like. An example of such information is shown in TABLE 1 below representing an exemplary time index for content with the description of time segments and what operation is performed if the time position resides within a particular time segment.

TABLE 1

| Time Segment | Duration of Playback | Operation if Time Position Resides in Time Segment |
| --- | --- | --- |
| First Time Segment | 0 to 5 minutes | Jump to Beginning of Content for Playback |
| Second Time Segment | 5 to 55 minutes | Pause Playback of Content, Resume Playback When Receiving Control Signal Again |

TABLE 1-continued

| Time Segment | Duration of Playback | Operation if Time Position Resides in Time Segment |
| --- | --- | --- |
| Third Time Segment | 55 to 60 minutes | Jump to the Beginning of Next Content and Begin Playback of the Next Content |

Figure 5:
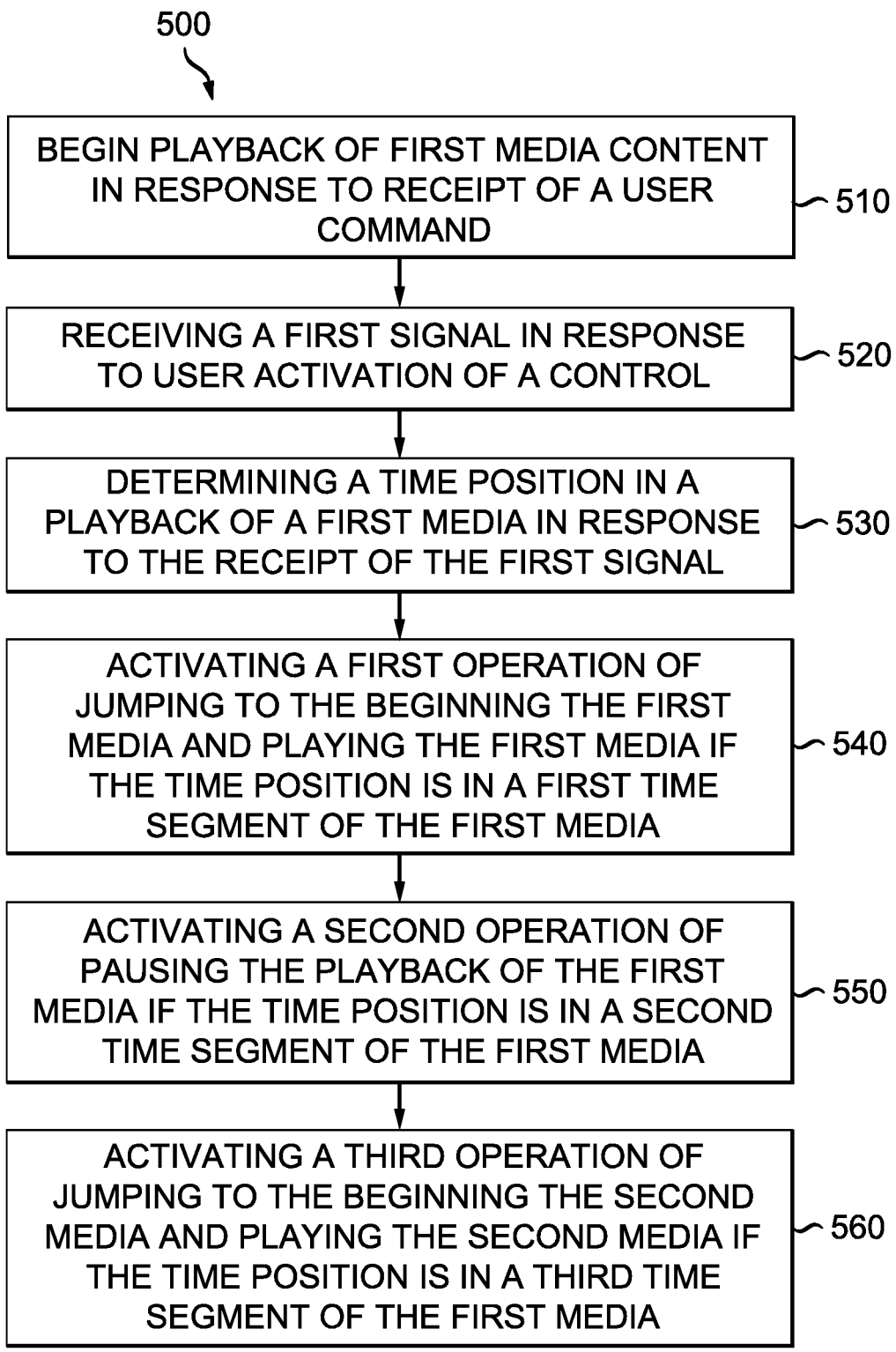
FIG. 5 illustrates an exemplary flow chart corresponding to a method for providing different operations during the playback of content in accordance with some embodiments.

FIG. 5 illustrates an exemplary flow chart 500 corresponding to a method for providing different operations during the playback of content in accordance with some embodiments. In step 510, a user command is received by a computing device 100 to begin playback of first media content. The command can be from a control interface, user interface, and the like as described above.

In step 520, a first signal is received by user device 280 in response to user activation of a control. Again, the control signal can be initiated in response to a user command such as a remote control, user interface, and the like. Upon the receipt of the first signal, a determination is made by computing device 100 in step 530 to figure out a time position in a playback of the first media. This determination can be performed by a processor 110 as to determine how much time has elapsed in the playback the first content in accordance with the described principles where the time position correlates to the elapsed playback time.

In a general sense, the determined time position from step 530 can be matched to a defined time segment of content where the time segment can represent specific time duration as shown in exemplary FIG. 3. The determined time segment will cause a specific operation to happen which can change the playback of content to cause operations such as pause, fast forward, reverse, skip forward to another piece of content, jump backwards to a previously played piece of content, and the like. That is, instead of having to rely on multiple buttons or control for controlling the playback of content, a single control can be utilized to implement what operation a user would likely want at a certain time in the playback of a content. For example, if content is beginning, a user would activate the control to re-watch the cold opening of a television show. Likewise, a user could activate the same control to skip the ending credits and begin viewing new content if the user activated the control towards the final segment of content.

In the present disclosure, in step 540, the activation of a first operation of jumping to the beginning of the first media and playing the first media from such a position will occur if the time position is in a first time segment of the first media. This aspect of the disclosure could be used to provide In step 550, the activation of a second operation of pausing the playback of the first media occurs if the time position is in a second time segment of the first media. Note, the playback of the first media can resume based on a subsequent receipt of a user initiated signal after the pause operation of step 550 occurs.

In step 560, the activation of a third operation of jumping to the beginning of a second piece of media content and playing the second media from such a position, if it is determined that the time position is in a third time segment of the first media. The second media can be defined in accordance with a playlist. Other implementations of operations can be designated for different time segments by using a time index, as disclosed above.

In some optional embodiments, a user can utilize a command which toggles the operation of computing device 100 to consider a time position and the corresponding time segment of the time position for content. In a toggle "ON" position, the time position of content and the corresponding time segment will determine a specific operation when the first signal is received. In a toggle "OFF" option, the time position will not be considered and a pause operation will occur when the first signal is received, hence the pause operation can occur for all time positions of the content. Playback of the content resumes when a subsequent first signal is received.

One of ordinary skill in the art will recognize that the example processes described above in reference to FIG. 5 may be implemented in various different ways without departing from the scope of the disclosure. For instance, different embodiments may perform the operations in different orders than described. As another example, some embodiments may include additional operations and/or omit various listed operations. Each process may be divided into multiple sub-processes and/or combined with other processes to form macro processes. In addition, sub-sets of operations may be performed iteratively based on various appropriate criteria.

We claim:

1. A method to control the playback of media comprising:
receiving a first signal in response to user activation of a control;
designating a time position in a playback of a first media in response to the receipt of the first signal; and
activating an operation depending on the time designated position in the playback of the first media, wherein the operation to be performed is based on the designated time position in the playback of the first media and wherein user input determines what operation is to be performed based on the time position in the playback of the first media.

2. The method of claim 1, further comprising:
activating a first operation when the time position is in a first time segment of the first media;
activating a second operation when the time position is in a second time segment of the first media; and
activating a third operation when the time position is in a third time segment of the first media.

3. The method of claim 2, wherein the first operation is jumping to a beginning of the first media and playing back the first media, the second operation is pausing the playback of the first media, and the third operation is jumping to a beginning of a second media and playing back the second media.

4. The method of claim 3, wherein playback is resumed of the first media when a second signal is received when the time position is in the second time segment of the first media.

5. The method of claim 1, wherein said first media is at least one of: audio, video, animation, movie, television show, and streamed media.

6. The method of claim 1, further comprising:
receiving a second signal in response to a user activation of a second control resulting in the operation to be a pause in the playback of the first media upon subsequent receipt of the first signal for all time positions in the playback of the first media.

7. The method of claim 6, further comprising:
resuming playback of the first media upon the second subsequent receipt of the first signal.

8. The method of claim 1 wherein the first signal comes from activation of only one control.

9. An apparatus to control the playback of media comprising:
a processor configured to execute a set of instruction;
a memory that stores the set of instructions, the set of instructions when executed by the processor perform operations comprising:
receiving a first signal in response to user activation of a control;
designating a time position in a playback of a first media in response to the receipt of the first signal; and
activating an operation depending on the designated time position in the playback of the first media, wherein the operation to be performed is based on the designated time position in the playback of the first media and wherein user input determines what operation is to be performed based on the time position in the playback of the first media.

10. The apparatus of claim 9, wherein the set of instructions further comprises instructions when executed by the processor perform:
activating a first operation when the time position is in a first time segment of the first media;
activating a second operation when the time position is in a second time segment of the first media; and
activating a third operation when the time position is in a third time segment of the first media.

11. The apparatus of claim 10, wherein the first operation is jumping to a beginning of the first media and playing back the first media, the second operation is pausing the playback of the first media, and the third operation is jumping to a beginning of a second media and playing back the second media.

12. The apparatus of claim 11, wherein playback is resumed of the first media when a second signal is received when the time position is in the second time segment of the first media.

13. The apparatus of claim 9, wherein said first media is at least one of: audio, video, animation, movie, television show, and streamed media.

14. The apparatus of claim 9, wherein the set of instructions further comprises instructions when executed by the processor perform:
receiving a second signal in response to a user activation of a second control resulting in the operation to be a pause in the playback of the first media upon subsequent receipt of the first signal for all time positions in the playback of the first media.

15. The apparatus of claim 14, wherein the set of instructions further comprises instructions when executed by the processor perform:
resuming playback of the first media upon the second subsequent receipt of the first signal.

16. The apparatus of claim 9, wherein the first signal comes from activation of only one control.

* * * * *